`US005468458A`

United States Patent [19]
Watson

[11] Patent Number: 5,468,458
[45] Date of Patent: Nov. 21, 1995

[54] TREATMENT OF GAS STREAMS

[75] Inventor: Richard W. Watson, Ilkley, England

[73] Assignee: The BOC Group plc, Windlesham, England

[21] Appl. No.: 41,800

[22] Filed: Apr. 1, 1993

[30] Foreign Application Priority Data

Apr. 6, 1992 [GB] United Kingdom ............... 9207496
Apr. 21, 1992 [GB] United Kingdom ............... 9208550
Oct. 15, 1992 [GB] United Kingdom ............... 9221700

[51] Int. Cl.$^6$ .................. B01D 53/86; C01B 17/04; C01B 17/16; C01B 17/48
[52] U.S. Cl. ............. 423/222; 423/242.1; 423/244.09; 423/574.1; 423/576; 423/576.8; 422/171; 422/172; 422/173; 422/190
[58] Field of Search ................ 423/222, 242.1, 423/244.09, 576, 576.8, 574.1, 574.2, 564; 422/171, 172, 173, 190

[56] References Cited

U.S. PATENT DOCUMENTS

| | | | |
|---|---|---|---|
| 2,413,714 | 1/1947 | Keeling | 423/576 |
| 4,522,747 | 11/1985 | Goar | 423/574 R |
| 4,797,268 | 1/1989 | McGovern et al. | 423/574 R |
| 4,842,843 | 6/1989 | Pendergraft | 423/574 R |
| 4,844,881 | 7/1989 | Gens et al. | 423/574 R |
| 4,919,912 | 4/1990 | Taggart et al. | 423/574 R |

FOREIGN PATENT DOCUMENTS

| | | |
|---|---|---|
| 0160332 | 11/1985 | European Pat. Off. . |
| 0165609 | 12/1985 | European Pat. Off. . |
| 0500320 | 8/1992 | European Pat. Off. . |

*Primary Examiner*—Gary P. Straub
*Assistant Examiner*—Timothy C. Vandy
*Attorney, Agent, or Firm*—David M. Rosenblum; Larry R. Cassett

[57] ABSTRACT

A part of the hydrogen sulphide content of a feed gas stream comprising hydrogen sulphide is burned by a burner that fires into a furnace. The combustion is supported by a stream of oxygen or oxygen-enriched air. Resulting sulphur dioxide reacts with residual hydrogen sulphide in the furnace to form sulphur vapor. Sulphur is condensed out of the resulting gas mixture in a sulphur condenser. At least part of the sulphur-free gas mixture flows through a reactor in which its sulphur dioxide content is reduced to hydrogen sulphide. Water vapor is removed from the resulting gas stream in a water condenser. At least part of the gas stream now essentially free of water vapor is recycled to the furnace. A purge stream is taken either from immediately downstream of the sulphur condenser or from intermediate the water condenser and the furnace, or from the furnace and, if desired, subjected to further treatment to remove sulphur-containing gases therefrom.

18 Claims, 5 Drawing Sheets

TREATMENT OF GAS STREAMS

BACKGROUND OF THE INVENTION

This invention relates to the treatment of gas streams comprising hydrogen sulphide.

Several industrial process, particularly in the refining of oil and natural gas, produce waste gas streams that include hydrogen sulphide. Since hydrogen sulphide is particularly poisonous it is necessary to treat such streams so as to extract their sulphur values upstream of their being vented to the atmosphere. One known process for treating a gas stream including hydrogen sulphide is the Claus process. In the Claus process approximately one third of the hydrogen sulphide content of the gas stream is burnt in a furnace to form sulphur dioxide and water vapor. The sulphur dioxide then reacts in the furnace with residual hydrogen sulphide to form sulphur vapor and water vapor. The stoichiometry of these reactions is shown in the following equations:

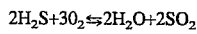

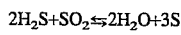

The resulting sulphur vapor tends to exist in a number of different molecular species at different temperatures. Above 800° C., for example, it exists mainly as the dimer $S_2$. In addition to these reactions, there is a tendency for hydrogen sulphide to dissociate at elevated temperatures into hydrogen and sulphur vapor. This reaction is reversible and on cooling most of the hydrogen and sulphur vapor reassociates to form hydrogen sulphide. Moreover, if carbon dioxide and hydrocarbons are present in the gas stream, which typically occurs if the source of the gas stream is an oil refinery, small amounts of carbonyl sulphide and carbon disulphide are also formed.

The reaction between hydrogen sulphide and sulphur dioxide does not reach completion at the temperatures that are created in the furnace. Indeed, it typically reaches only about 60 to 70% of completion in the furnace. It is therefore the commercial practice to cool the resulting gas stream downstream of the furnace in, for example, a waste heat boiler, then to condense sulphur out of the cooled gas mixture, next to reheat the gas stream to a temperature in the order of 200° to 260° C., and to pass the reheated gas stream over a catalyst, for example alumina, of the reaction between hydrogen sulphide and sulphur dioxide so as to form further sulphur vapor and water vapor. The resulting sulphur vapor is then condensed. With two or three such trains of catalytic stages, it is typically possible to achieve only about 97% conversion of the hydrogen sulphide in the original gas stream. Further such catalytic stages are not normally employed since the concentration of hydrogen sulphide and sulphur dioxide in the gas stream becomes progressively lower with each catalytic stage, thereby adding to the difficulty of obtaining an adequate degree of conversion in each catalytic stage. Increasingly, rigorous standards concerning the protection of the environment make simple venting or incineration of the final gas stream an unattractive or impermissible choice. It is therefore becoming increasingly the commercial practice to pass the final gas stream to a so-called 'tail gas clean up' unit which is able effectively to treat the hydrogen sulphide and sulphur dioxide components of the gas stream notwithstanding their low concentrations. There are a number of different 'tail gas clean up' processes that are commercially available, for example, the SCOT process.

The Claus process has in recent years excited the interest of suppliers of oxygen separated from air. Conventionally, air had been used to support the combustion of hydrogen sulphide in the furnace. In consequence, large volumes of nitrogen are introduced in the air and flow through each stage of the process. The nitrogen takes up reactor space. It has therefore been proposed to substitute commercially pure oxygen for some or all of the air that is used to support combustion of the hydrogen sulphide, and thereby gain an increase in the rate of which a hydrogen sulphide containing feed gas can be accepted by the furnace. Depending on the exact composition of the feed gas, there can however be a limitation on the degree to which oxygen can be used to enrich the combustion air in oxygen, this limitation being that the temperature created at the lining of the furnace by the combustion increases with increasing concentration of oxygen in the combustion air until a temperature so high that the lining would be damaged in creation. This temperature limitation has been believed to prevent the complete substitution of pure oxygen for the combustion air when a feed stream relatively concentrated in combustibles, say containing more than about 70% by volume of hydrogen sulphide, is treated, although it is now understood that dissociation of hydrogen sulphide (which tends to take place at a higher rate with increasing flame temperature) has a moderating effect and may allow operation with pure oxygen in some circumstances with some configurations of burner and furnace. A number of proposals have been made to alter the Claus process so as to facilitate its use of pure oxygen or oxygen-enriched air to support combustion of hydrogen sulphide. Some of these proposals have involved the introduction of temperature moderating media into the hydrogen sulphide combustion region, sometimes by recycle of gas from a downstream stage of the treatment process, as is disclosed in, for example, EP-A-165 609. Others of these proposals have involved performing the combustion of the hydrogen sulphide in two or more stages, as is disclosed in, for example, EP-A-237 216 and EP-A-237 217.

There remains, however, a need to improve the effective conversion efficiency of a Claus process so as to facilitate downstream treatment of the resulting gas stream. It is an aim of the present invention to provide a method and apparatus that meet this need.

SUMMARY OF THE INVENTION

According to the present invention there is provided a method of treating a feed gas stream comprising hydrogen sulphide, comprising the steps of:

(a) in a first reactor converting to sulphur dioxide a part of the hydrogen sulphide content of the feed gas stream and reacting thus-formed sulphur dioxide with residual hydrogen sulphide to form sulphur vapor and water vapor, so as to produce a sulphur-containing gas stream comprising hydrogen sulphide, sulphur dioxide, water vapor and sulphur vapor;

(b) extracting sulphur vapor from the sulphur-containing gas stream;

(c) in a second reactor reducing to hydrogen sulphide the sulphur dioxide content of at least part of the gas stream from which sulphur vapor has been extracted;

(d) extracting water vapor from the reduced gas stream so as to form a secondary gas stream comprising hydrogen sulphide; and (e) either (i) returning at least part of the secondary gas stream to the first reactor and means for taking as a purge stream a part of the gas stream intermediate steps (b) and (c) or another part of the secondary gas stream, or both, and/or a gas stream from the first reactor comprising hydrogen sulphide, sulphur dioxide, sulphur vapor and water vapor;

or (ii) taking at least part of the secondary gas stream as a purge stream without returning any of it to the first reactor; and in either case:

(f) discharging the purge stream.

Depending on the composition of the purge stream, hydrogen sulphide in it is preferably subjected to reaction with sulphur dioxide in at least one further reactor upstream of being discharged to the atmosphere.

The invention also provides apparatus or plant for treating a feed gas stream comprising hydrogen sulphide, comprising:

(a) a first reactor for converting to sulphur dioxide a part of the hydrogen sulphide content of the feed gas stream and for reacting thus-formed sulphur dioxide with residual hydrogen sulphide to form sulphur vapor and water vapor, so as to produce a sulphur-containing gas stream comprising hydrogen sulphide, sulphur dioxide, water vapor and sulphur vapor;

(b) means for extracting sulphur vapor from the sulphur-containing gas stream;

(c) a second reactor, downstream of the sulphur vapor extraction means, for reducing to hydrogen sulphide the sulphur dioxide content of at least part of the gas stream;

(d) means for extracting water vapor from the reduced gas stream so as to form a secondary gas stream comprising hydrogen sulphide;

(e) either (i) means for returning at least part of the secondary gas stream to the first reactor and for taking as a purge stream a part of the gas stream intermediate the sulphur extraction means and the second reactor or another part of the secondary gas stream, or both, and/or a gas stream from the first rector comprising hydrogen sulphide, sulphur dioxide, sulphur vapor, and water vapor;

(ii) means for taking at least part (and preferably all) of the secondary gas stream as a purge stream without returning any of it to the first reactor; and in either case:

(f) means for discharging the purge stream.

The step of extracting water from the reduced gas stream enables the rate at which water vapor enters any further reactor to be kept down. This enables a number of benefits to be achieved particularly when the content of combustibles in the feed gas stream is relatively high (e.g. above 70% by volume) and when the conversion of said part of the hydrogen sulphide to sulphur dioxide is performed using pure oxygen or oxygen-enriched air to support its combustion. For a given feed gas flow rate and composition, the method according to the invention enables the size of the further reactors and any "tail gas clean up" plant to be reduced in comparison to those used in a conventional method or in a method as described in any of the aforementioned patent applications. Moreover, also in comparison with conventional methods or with methods described in the aforementioned patent applications, the concentration of reactants in the further reactor or reactors Is increased, making possible an increase in the overall conversion of hydrogen sulphide to sulphur. If at least part of the secondary gas stream is returned as a recycle stream to said first reactor it is possible to achieve therein a total rate of conversion of hydrogen sulphide to sulphur which is more than 70% of the rate at which hydrogen sulphide is supplied to the first reactor in the feed gas mixture, i.e. an 'effective conversion' of more than 70% may be achieved. The effective conversion accordingly increases with increasing recycle stream to purge stream ratios.

Preferably, the first reactor is a refractory-lined furnace having extending through one end wall thereof a burner to which oxygen or oxygen-enriched air and the feed gas stream are passed. Alternatively, the burner may in some circumstances be mounted tangentially through the side wall of the furnace. The furnace is preferably operated at a temperature close to the maximum which the lining can withstand so as to maximise the amount of reaction between hydrogen sulphide and sulphur dioxide in the furnace. The amount of hydrogen that is formed by dissociation of hydrogen sulphide and hence the amount of hydrogen that remains in the gas mixture on leaving the sulphur extraction means is also maximised. Such hydrogen is used to reduce sulphur dioxide in the second reactor (and any residual sulphur) and therefore its presence in the gas stream entering the second reactor is desirable.

There are three main classes of methods according to this invention. In the first two classes, all the gas leaving the first reactor does so from the same region thereof. In the third class, the purge stream is taken from an intermediate region of the first reactor and has a mole ratio of hydrogen sulphide to sulphur dioxide less than the mole ratio thereof at the downstream end of the first reactor.

In the first class of methods according to the invention, the mole ratio of hydrogen sulphide to 'available' oxygen entering the first reactor is 'stoichiometric'. By 'available' oxygen as used herein is meant that oxygen which is available for reaction with hydrogen sulphide and excludes oxygen which reacts preferentially with more readily combustible components of the feed gas, for example ammonia and hydrocarbons (if present). By 'stoichiometric' in this context is meant that the said mole ratio is with in the range 1.8 to 2.2:1.

Accordingly, the ratio of hydrogen sulphide to sulphur dioxide in the gas stream leaving the sulphur extraction means is approximately two to one, thus corresponding to the stoichiometry of the reaction between hydrogen sulphide and sulphur dioxide that forms sulphur vapor and water vapor. Accordingly, if the purge stream is taken from intermediate steps (b) and (c) of the process according to the invention, it can be subjected to one or preferably a plurality of stages of catalyzed reaction between hydrogen sulphide and sulphur dioxide so as to recover further sulphur and to form a gas mixture which is suitable, if desired, for treatment by a conventional 'clean-up' process such as the SCOT process. In the first class of methods according to the invention, the recycle to the first reactor of the gas stream from which water has been extracted makes possible higher effective conversions of hydrogen sulphide to sulphur in the first reactor than is achievable in a conventional process.

In the second class of methods according to the invention, the mole ratio of hydrogen sulphide to available oxygen entering the first reactor is in excess of the ratios designated herein as 'stoichiometric'. In this second class, this mole ratio is typically in the range of 3:1 to 5:1. Accordingly, there is a stoichiometric excess of hydrogen sulphide relative to sulphur dioxide in the gas stream that leaves the sulphur extraction means. In consequence, it is not now preferred to take the purge stream from intermediate steps (b) and (c) of the process according to the invention. Instead, it is preferred to pass all of the gas stream that leaves the sulphur extraction means to the second reactor so that its sulphur dioxide content can be converted back to hydrogen sulphide. Accordingly, the purge stream is taken from downstream of the water vapor extraction means. In some examples, a part of the hydrogen sulphide content of the purge stream is preferably burnt in a first further reactor so as to form sulphur dioxide and water vapor. Oxygen or oxygen-enriched air is preferably used to support this combustion. Resulting sulphur dioxide reacts with residual hydrogen sulphide in the first further reactor to form water vapor and sulphur vapor. Preferably, the mole ratio of hydrogen sulphide to available oxygen entering the first further reactor in which these further reactions take place is 'stoichiometric' so as to enable the resulting gas mixture, downstream of a stage of sulphur extraction, to be subjected first to one or preferably a plurality of stages of catalysed reaction between hydrogen sulphide and sulphur vapor, and secondly, if desired, to a conventional cleaning by a process such as the SCOT process. The total conversion of hydrogen sulphide achievable upstream of the catalysed stages of reaction when using a method for the second class is greater than that which can be achieved upstream of the catalytic stages of a comparable conventional Claus process.

The second class of methods according to the invention may be operated with or without recycle of a part of the secondary gas stream to the first reactor. Operation without such a recycle makes necessary fewer items of plant and is simpler. Nonetheless, such a recycle makes possible even higher total rates of conversion of hydrogen sulphide to sulphur than those possible with the first class of method or with the second class of methods without a recycle. The effective conversion in the first reactor accordingly increases with increasing recycle to purge ratios. If it is desired to achieve a high effective conversion, one or both of the feed gas stream and the recycle stream are preferably preheated to a temperature preferably in the range of 100° to 500° C. so as to make possible enhanced recycle to purge ratios without causing such a decrease in flame temperature in the first reactor that stable combustion can no longer be achieved. Indeed, with a feed gas stream comprising at least 90% by volume of hydrogen sulphide we believe it is possible to achieve an effective conversion in the first reactor of more than 95% and typically in the order of 98%. Such high effective conversions make it possible, in the second class of methods according to the invention, to send the purge stream directly to, for example, either a unit for separating and recovering hydrogen sulphide (which is preferably recycled) or an incinerator without subjecting any of its hydrogen sulphide content to further reaction with sulphur dioxide. Accordingly, neither catalytic reactors such as those used in a conventional Claus process nor a second furnace similar to the first reactor are then required for treatment of the purge stream.

In the third class of methods according to the invention, at least part of the secondary gas stream is returned to the first reactor. At least part of the returning gas preferably by-passes the flame or combustion zone in the first reactor, and the purge gas stream is preferably taken from a region of the first reactor downstream of the flame zone but upstream of the zone in the first reactor where the returning gas mixes with gas that has passed out of the flame zone. Such by-passing helps to depress the mole fraction of sulphur dioxide in the gas mixture at the entry to the second reactor and thereby helps to limit the temperature rise that takes place as a result of the reduction of the sulphur dioxide in the second reactor.

The mole ratio of hydrogen sulphide to sulphur dioxide in the purge gas stream in a method according to the third class is preferably less than 2.2:1 and more preferably in the order of 2:1. If the mole ratio is substantially less than 2:1, it is preferably increased by mixing a part of the secondary gas stream with the purge gas stream typically to a value in the order of 2:1.

Preferably in the third class of methods according to the invention sulphur vapor is extracted from the purge gas stream by, for example, condensation, and the resulting purge gas stream is subjected to at least one stage of catalytic reaction between hydrogen sulphide and sulphur dioxide to form sulphur vapor and water vapor, with sulphur vapor being extracted therefrom, for example by condensation. If the mole ratio of hydrogen sulphide to sulphur dioxide is in the order of 2 to 1 at the inlet to the first such stage of catalytic reaction there is no need to burn a part of the hydrogen sulphide content of the purge gas stream which would otherwise be necessary were this mole ratio significantly in excess of 2:1. Accordingly methods in said third class are capable of being operated with a single combustion stage, namely that in the first reactor.

The rate at which the purge gas stream is taken from the first reactor is selected so as to maintain an overall mass balance and avoid any build-up of non-reactive components of the feed gas (for example, carbon dioxide).

If in the third class of methods the feed gas contains no ammonia, a part of it preferably by-passes the flame zone of the first reactor and the region from which the purge gas stream is taken. Residual ammonia at the exit of the first reactor would flow into the second reactor and deactivate catalyst therein. If there are two separate feed streams comprising hydrogen sulphide, one containing ammonia, the other not, (for example "sour water stripper gas" and "amine gas") all the feed gas stream containing ammonia is fed to the flame zone of the first reactor, and preferably at least some of the feed gas stream not containing ammonia by-passes the flame zone of the first reactor and the region from which the purge gas is taken. Having some of the secondary gas stream returned to the first reactor by-pass the flame zone keeps down the proportion of non-combustibles entering the flame zone and hence facilitates the creation of a flame temperature sufficiently high to ensure that all the ammonia is oxidized.

The sulphur vapor is preferably extracted from the sulphur containing gas stream by being condensed out of the gas stream.

The reduction of the sulphur dioxide content of the gas stream in step (c) of the method according to the invention is preferably performed in a catalysed reaction with hydrogen. Any traces of sulphur present are also reduced. The size of the demand, if any, by the reduction reactions for hydrogen from an external source depends partly on the sulphur dioxide content of the gas stream from which sulphur has been extracted and partly on the amount of hydrogen that is made available to the reduction reaction as a result of its in situ formation. There are we believe two main mechanisms by which hydrogen is formed in situ. Some hydrogen is present in the gas stream from which sulphur is extracted as a result of the reversible thermal dissociation in the first reactor of hydrogen sulphide. If carbon dioxide is present in the feed gas, dissociation of carbon dioxide into carbon monoxide and oxygen takes place to some extent in the first reactor. Resulting carbon monoxide may react with water vapor over the catalyst in the second reactor to form further hydrogen. In general, if a mole ratio of hydrogen sulphide to available oxygen sufficiently above the stoichiometric ratios is used in the first reactor, we believe it is possible to operate the second reactor without an external supply of reductant.

Accordingly, we believe it is possible to operate the first class of methods according to the invention with, and the second class of methods according to the invention without a supply of hydrogen from an external source to the second reactor. The catalytic reduction of the sulphur dioxide preferably takes place at a temperature of about 300° C. The gas stream to be reduced is preferably pre-heated to a chosen temperature upstream of the second reactor. The catalytic reduction of sulphur dioxide by hydrogen to hydrogen sulphide is a well known process and forms, for example, part of the SCOT process. Suitable catalyst, for example one based on cobalt and molybdenum is therefore commercially available. If desired, steam may be introduced into the second reactor so as to control the temperature therein.

The water vapor is preferably extracted from the reduced gas stream by being condensed out of this gas stream. The condensation step may, for example, be performed by countercurrent contact of the reduced gas stream with a water stream in a packed column.

If desired, the gas stream from which water has been extracted may be subjected upstream of step (e) to a further treatment to separate hydrogen sulphide from other components thereof. This gas stream may for example be washed with an amine to effect such separation. The amine is preferably able to separate hydrogen sulphide from carbon dioxide. Such treatment is believed to be only of value if the feed gas stream has a relatively high proportion in total of non-combustibles, and therefore can extend the range of those hydrogen sulphide containing feed streams suitable for treatment in accordance with the invention to those containing say as little as 20% by volume of hydrogen sulphide, or in some circumstances if it is desired to omit further stages of reaction between hydrogen sulphide and sulphur dioxide from the method according to the invention.

BRIEF DESCRIPTION OF THE DRAWINGS

The method and apparatus according to the invention will now be described by way of example with reference to the accompanying drawings, in which.

DETAILED DESCRIPTION

Figure 1:
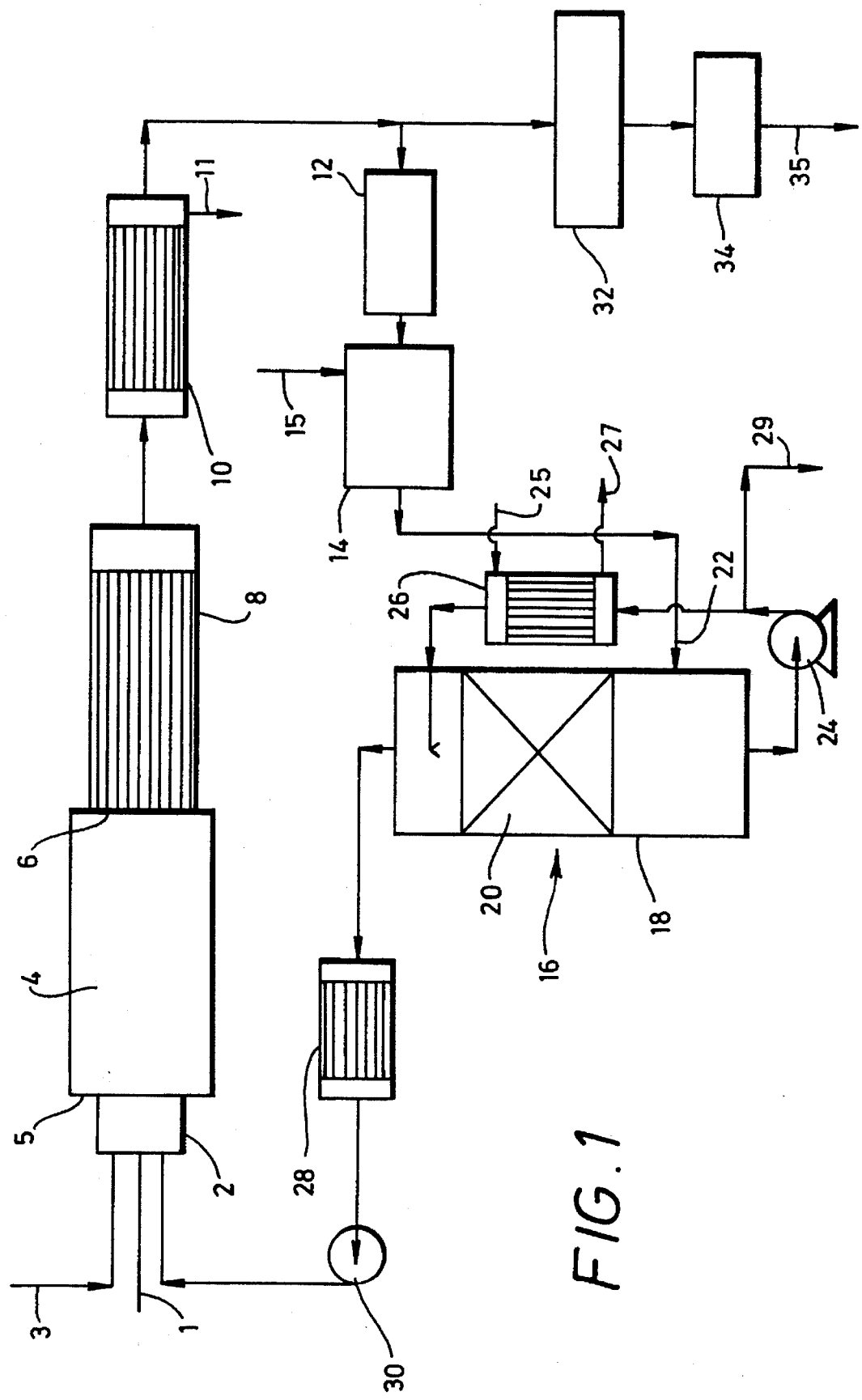
FIG. 1 is a schematic flow diagram illustrating a first plant for treating a feed gas stream comprising hydrogen sulphide.

Referring to FIG. 1 of the drawings, a hydrogen sulphide containing feed gas stream typically comprising at least 70% by volume of combustibles and typically additionally including carbon dioxide is fed from a pipeline 1 to a burner 2 which fires into a first reactor in the form of a refractory lined furnace 4 through one end wall 5 thereof. The feed gas stream is mixed upstream of its entry into the burner 2 with a recycle stream also comprising hydrogen sulphide and carbon dioxide, the formation of which is described below. The burner 2 is also supplied separately from a pipeline 3 with a stream of oxygen (that has been separated from air) or oxygen-enriched air. The ratio of the rate of supply of hydrogen sulphide to the rate of supply of available oxygen molecules is arranged to be 'stoichiometric'. Accordingly, in a flame zone (not shown) produced by the burner about one third of the incoming hydrogen sulphide is burnt to yield sulphur dioxide and water vapor. If the feed gas contains components, such as ammonia or hydrocarbons, with which oxygen reacts in preference to hydrogen sulphide, sufficient extra oxygen is supplied to enable these components to be totally consumed. Sulphur dioxide formed by the combustion of hydrogen sulphide reacts in the furnace 4 with residual hydrogen sulphide to form sulphur vapor and water vapor. A number of other chemical reactions take place in the furnace 4, particularly its flame zone. For example, there is some dissociation of hydrogen sulphide into hydrogen and sulphur vapor and also some dissociation of carbon dioxide into carbon monoxide and oxygen, the extent of each dissociation being temperature dependent. In addition, a small amount of carbon disulphide may be formed by reaction at elevated temperature between sulphur and any hydrocarbon present in the feed gas and a small amount of carbon oxysulphide (carbonyl sulphide) by reaction between carbon monoxide and sulphur. In general, it is preferred to employ a high flame temperature (e.g. 1250° to 1650° C.) so as to favor the reaction between hydrogen sulphide and sulphur dioxide and also to favour dissociation of hydrogen sulphide and thereby produce hydrogen for use in the downstream reduction of sulphur dioxide while also causing there to be some small reduction in the demand for oxygen from the external supply. Accordingly, it is preferred that the amount of nitrogen and other non-reactive gases in the context of the Claus process that are introduced into the furnace 4 with the oxygen is minimized. The oxygen therefore preferably contains less than 5% by volume and more preferably less than 1% by volume of impurities.

In operating the burner 2 and the furnace 4, care of course should desirably be taken to avoid causing undue damage to the furnace lining. Having regard to the composition of hydrogen sulphide feed streams that are typically formed in operation of, say, oil refineries, the positioning of the burner 2 through the end wall 5 of the furnace 4 (in preference to a 'tangential' arrangement) and/or the use of a short flame will in many cases avoid such damage, bearing in mind that thermal dissociation of hydrogen sulphide and carbon dioxide has a cooling effect and that there is some recycle of non-combustibles, e.g. argon and nitrogen, to the furnace 4. In the event that notwithstanding these factors, the flame temperature is calculated to be undesirably high, either a lower purity source of oxygen may be used, or an external moderator such as liquid water or water vapor may be introduced into the flame zone of the burner 2.

As a result of the reactions that take place in the furnace 4, a gas stream comprising hydrogen sulphide, sulphur dioxide, water vapor, sulphur vapor, hydrogen, carbon dioxide and carbon monoxide together with traces of argon, nitrogen, carbon oxysulphide and carbon disulphide leaves the furnace 4 through an outlet 6, typically at a temperature in the range of 1200° to 1600° C. At such temperatures, some of the components of the gas stream are still reacting with one another so it is difficult to determine the precise composition of the gas mixture. The gas stream that exits the furnace 4 through the outlet 6 passes to a waste heat boiler 8 or other form of heat exchanger in which it is cooled to a temperature in the range of 250° to 400° C. During the passage of the gas stream through the waste heat boiler, there is a tendency for some of the hydrogen to reassociate with sulphur to form hydrogen sulphide. The cooled gas stream passes from the waste heat boiler 8 to a sulphur condenser 10 in which it is further cooled and in which sulphur vapor is condensed and extracted via an outlet 11. The resulting liquid sulphur is typically passed to a sulphur seal pit (not shown). The gas stream from which sulphur has been extracted contains typically about 15 to 20% of the sulphur content of the feed stream depending on the size of the recycle stream and leaves the sulphur condenser 10 at a temperature of about 190° C. and is divided into recycle and purge streams.

The recycle stream is heated to a temperature of about 300° C. in a heater 12 which may, for example, take the form of a heat exchanger employing steam as a heat exchange medium. The thus heated first subsidiary gas stream flows from the heater 12 into a second reactor 14 including a catalyst, for example, of cobalt and molybdenum, that catalyses the reduction to hydrogen sulphide by hydrogen of sulphur dioxide and any residual trace of sulphur. Reaction of carbon monoxide with water vapor may also take place over the catalyst in the second reactor 14 to form hydrogen and carbon dioxide. Nonetheless, the mole ratio of sulphur dioxide to hydrogen may generally be in excess of that required for complete reduction of the sulphur dioxide in accordance with the equation:

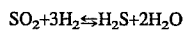

$$SO_2 + 3H_2 \rightleftharpoons H_2S + 2H_2O$$

If so, hydrogen is passed from an external source (not shown) into the second reactor 14 via a pipeline 15 at a rate sufficient to cause complete reduction to hydrogen sulphide of all the sulphur and sulphur dioxide present. The hydrogen may be generated on site by, for example, the sub-stoichiometric combustion of hydrocarbon, preferably using pure oxygen or oxygen-enriched air to support the combustion.

Other reactions in addition to the reduction of the sulphur and sulphur dioxide content of the recycle gas stream may take place in the second reactor 14. In particularly, any carbonyl sulphide (COS) or carbon disulphide ($CS_2$) present is hydrolysed in accordance with the following equations:

$$COS + H_2O \rightleftharpoons CO_2 + H_2S$$

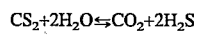

$$CS_2 + 2H_2O \rightleftharpoons CO_2 + 2H_2S$$

A reduced recycle stream now consisting essentially of hydrogen sulphide, water vapor, carbon dioxide, nitrogen and argon leaves the second reactor 14 and passes into a water condenser 16 in the form of a column 18 containing a packing 20 of liquid-gas contact members. The gas stream is introduced into a lower region of the column 18 beneath the packing 20 through an inlet 22. The gas stream passes generally upwards through the packing 20 and comes into intimate contact with a descending flow of water. Water vapor in the gas stream thus condenses and enters the descending liquid phase. Accordingly, a gas stream relatively free of water vapor leaves the top of the column 18. Water leaves the bottom of the column 18 and is passed by a pump 24 through a heat exchanger 26 in which it is cooled to a temperature of about 25° to 35° C. by indirect heat exchange with cold water that enters through an inlet 25 and leaves from an outlet 27. The resulting cooled water is recycled to an upper region of the column 18 above the packing 20 and passes downwards again through the packing.

A small proportion of the hydrogen sulphide content of the recycle stream dissolves in the water with which it is contacted in the condenser 16. In a typical oil refinery, such hydrogen sulphide is recovered by taking a part of the recycling water and passing it to a sour water stripper (not shown) via a pipeline 29.

The gas stream passing out of the top of the water condenser 16 is preferably treated so as to ensure that it is free of entrained drops of liquid. It is therefore passed through a heater 28 in which it is heated, for example, by indirect heat exchange with steam, to a temperature in the order of 50° C. Alternatively, or in addition, a 'knock out pot' (not shown) may be used to disengage drops of liquid from the gas stream.

The recycle stream is returned to the burner 2. The proportion in the feed gas stream of components other than hydrogen sulphide, for example argon, oxides of carbon and nitrogen is higher than in the feed stream. The flow of the recycle gas is created by a fan 30 which is located downstream of the heater 28.

Although the recycle gas stream is shown in FIG. 1 of the accompanying drawings as being returned to the burner 2 it may, if desired, be returned directly to the furnace 4 without passing through the burner 2.

The purge stream is passed through a train of stages shown generally by the reference numeral 32 in FIG. 1 in each of which first it is reheated to a temperature suitable for a catalysed reaction between hydrogen sulphide and sulphur dioxide, secondly this catalyzed reaction is carried out over a suitable catalyst (for example alumina or bauxite), and thirdly sulphur vapor produced by the reaction between hydrogen sulphide and sulphur dioxide is extracted from the gas stream by passage through a sulphur condenser having an exit temperature in the range of 130° to 170° C. Typically two or three such stages may be used in series with each respective reheat temperature in the range of 200° to 250° C. Downstream of its passage through the train of catalytic reaction stages 32, the purge stream may be passed through a conventional 'tail gas clean up plant' 34 which may, for example, operate the SCOT process. The gas leaving the plant 34 through an outlet 35 may then be incinerated and vented to the atmosphere.

In operation, a plant as shown in FIG. 1 is typically able to achieve, say, a seventy percent conversion of hydrogen sulphide to sulphur vapor in the furnace 4, based on the total flow of hydrogen sulphide. If, however, the recycle flow is discounted, the effective conversion is considerably higher. Indeed, analysing the process as a whole, the overall conversion achieved after a train 32 of three catalytic stages is typically up to 1% higher, depending on feed gas composition, than is achievable using a comparable conventional air based plant having a similar train of three catalytic stages. Moreover, the flow rate of gas through the catalytic stages 32 is about 25% of an air based plant having the same sulphur output. Similarly, the size of the tail gas clean up plant 34 may be 25% of that needed to treat the effluent gas from a comparable conventional air-based plant.

The relative proportions of the recycle and purge streams are selected so that the latter maintains a constant purge of non-combustibles (argon, nitrogen and oxides of carbon) from the furnace 4 equivalent to the total of the rates of inflow of non-combustibles with the feed gas stream and the oxygen and the rate of production of these non-combustibles by combustion of components such as ammonia and hydrocarbons in the feed gas stream. The sulphur content of the purge needs also to be equal to the sulphur contained in the feed gas stream minus the sulphur recovered in the condenser 10. The ratio of recycle to purge flow may be determined typically by an initial computer simulation or by a calculation of the operation of the method to predict the optimum ratio. In practice, given the sizeable number of different chemical reactions that take place, actual stream compositions will tend inevitably to vary from those predicted. Nevertheless, it is a simple matter to adjust the recycle flow to obtain constant flow under the desired conditions.

In a modification to the plant shown in FIG. 1, the recycle stream may be taken from a region intermediate the reheat section and the catalytic reactor of the first stage of the train 32, instead of being taken, as shown, from upstream of the train 32 of catalytic stages.

Figure 2:
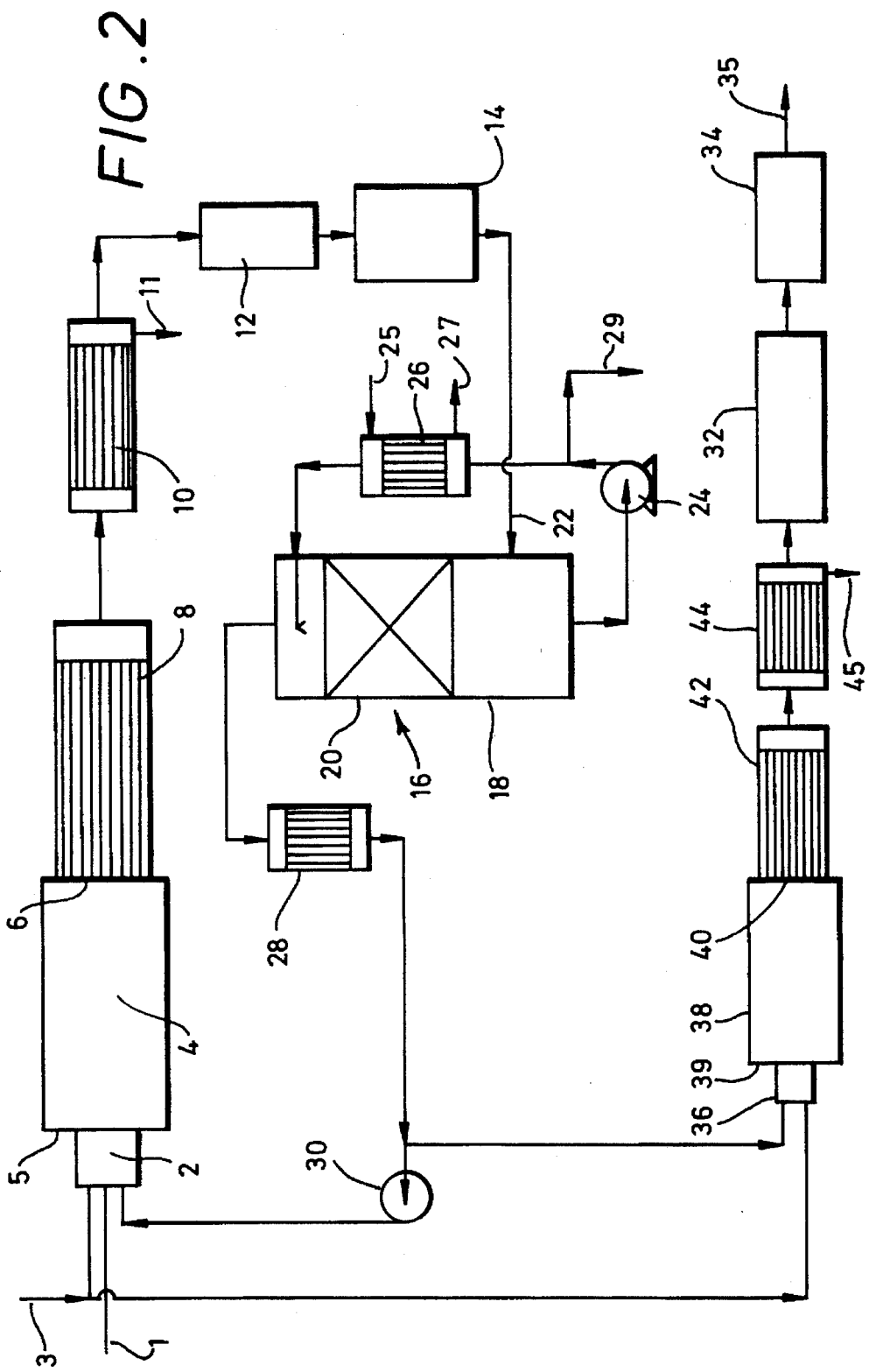
FIG. 2 is a schematic flow diagram illustrating a second plant for treating a feed gas stream comprising hydrogen sulphide.

Referring now to FIG. 2 of the accompanying drawings, there are a considerable number of similarities between the plant shown therein and the plant shown in FIG. 1 and like parts in the two Figures are indicated by the same reference numerals even though in some cases the respective parts are operated differently or communicate with different upstream regions. The plant shown in FIG. 2 has an arrangement of a burner 2 and furnace 4 substantially the same as that shown in FIG. 1. However, the operation is different, since the total rate of flow of hydrogen sulphide into the burner 2 shown in FIG. 2 in comparison to the rate of flow of oxygen is such that typically 15 to 28% by volume of the hydrogen sulphide total is burned to form sulphur dioxide and water vapor. Pure oxygen is preferably used to support combustion of the hydrogen sulphide in the furnace 4 shown in FIG. 2 even when the feed gas stream is particularly rich in combustibles since the remaining (greater than conventional) amount of hydrogen sulphide has a temperature moderating effect. Another consequence of this sizeable excess of hydrogen sulphide over the stoichiometric amount required for reaction with sulphur dioxide that is formed by combustion of a part of the hydrogen sulphide is that it helps to boost the proportion of sulphur dioxide that reacts.

The plant shown in FIG. 2 has a waste heat boiler 8 and a sulphur condenser 10 fully analogous In construction and operation with the corresponding units in the plant shown in FIG. 1. Accordingly, their operation is not described again. However, downstream of the condenser 10 shown in FIG. 2, all the gas stream from which sulphur vapor has been extracted is passed to a heater 12 in which it is heated to a temperature of about 300° C. and then to a second reactor 14 which in all respects save one is analogous to the reactor 14 shown in FIG. 1. The one difference is that in consequence of the relatively low proportion of the hydrogen sulphide entering the furnace 4 that is burnt to form sulphur dioxide, the mole ratio of hydrogen to sulphur dioxide in the gas stream entering the second reactor 14 of the plant shown in FIG. 2 will normally be sufficient for all the sulphur dioxide to be fully reduced to hydrogen sulphide by reaction with hydrogen present in the gas stream without the need to introduce hydrogen into the second reactor 14 from an external source. Accordingly the pipeline 15 is omitted from the plant shown in FIG. 2.

A reduced gas stream passes out of the second reactor 14 shown in FIG. 2 into a water condenser 16 which is analogous in all respects to that shown in FIG. 1. Accordingly, its operation is not described again. Similarly, the heater 18 or knock out pot (or both) is analogous to that described with respect to FIG. 1 and its operation is also not described again.

A part only of the gas stream which has been freed of the liquid droplets by operation of the heater 28 is returned by fan 30 to the burner 2 as a recycle stream. The remainder of the gas stream leaving the heater 28 is passed as a purge stream to a second burner 36 that fires typically through an end wall 39 of a second refractory lined furnace 38 for reacting hydrogen sulphide with sulphur dioxide. Pure oxygen or oxygen-enriched air is introduced into the burner 36 from the pipeline 3 separately from the hydrogen sulphide containing gas stream. The rate of supply of the oxygen or oxygen-enriched air to the burner 36, is such as to burn approximately one third of the hydrogen sulphide content of the gas stream that passes from the heater 28 to the burner 36. As a result water vapor and sulphur dioxide are formed. Resulting sulphur dioxide reacts with remaining hydrogen sulphide to form sulphur vapor and further water vapor. In addition, there is some dissociation of hydrogen sulphide in the flame zone (not shown) of the burner 36 into hydrogen and sulphur vapor. Other reactions also take place in the furnace 38. For example, there is dissociation of carbon dioxide into carbon monoxide and oxygen. In addition, a small amount of carbon oxysulphide may be formed by reaction between carbon monoxide and hydrogen sulphide at elevated temperature. The extent to which these reactions take place depends on the composition of the feed gas mixture and the flame temperature created in the furnace 38. In general, it is preferred to employ a flame temperature typically in the range of 1000° to 1600° C. It is preferred that the amount of nitrogen and other non-reactive gases in the context of the Claus process that are introduced into the furnace 38 with the oxygen be minimised. The oxygen therefore preferably contains less than 5% by volume and more preferably less than 1% by volume of impurities. It is important, however, to avoid damaging the refractory lining of the furnace 38, and accordingly the burner 36 is operated with a short flame so as to minimise the risk of damage being done to the refractory lining of the furnace 38. In any event, if the hydrogen sulphide content of the gas stream fed to the burner 36 from the heater 28 contains more than, say, 70% by volume of hydrogen sulphide, it may be desirable to moderate the flame temperature by introduction of, say, water vapor from an external source into the flame or to choose a less pure source of oxygen. Alternatively, the combustion of hydrogen sulphide can be performed in two separate stages (rather than in a single furnace 38) as described in EP-A-237 216 or EP-A-237 217.

As a result of the reactions that take place in the furnace 38, a gas stream comprising hydrogen sulphide, sulphur dioxide, water vapor, sulphur vapor, hydrogen, carbon monoxide and carbon dioxide together with traces of argon, nitrogen and carbon oxysulphide leaves the furnace 38 through an outlet 40, typically at a temperature in the range of 1000° to 1600° C. At such temperatures, some of the components of the gas stream are still reacting with one another, so it is difficult to determine the precise composition of the gas mixture. The gas stream that leaves the furnace 38 through the outlet 40 passes to a waste heat boiler 42 or other form of heat exchanger in which it is cooled to a temperature in the range of 300° to 400° C. During the passage of the gas stream through the waste heat boiler there is a tendency for some of the hydrogen to reassociate with sulphur to form hydrogen sulphide. The cooled gas stream passes from the waste heat boiler 42 to a sulphur condenser 44 in which it is further cooled and in which sulphur vapor is condensed and extracted via an outlet 45. The resulting liquid sulphur is typically passed to a sulphur seal pit (not shown). The gas stream from which sulphur has been extracted contains typically about 10 to 15% of the sulphur atoms present in the initial feed to the burner 2. It leaves the sulphur condenser 44 at a temperature of about 190° C. and is passed in sequence through a train 32 of catalytic stages and a tail gas clean up plant 34 which are analogous to the corresponding parts of the plant shown in FIG. 1. Accordingly, there is produced a gas stream which downstream of the tail gas clean up plant 34 may be incinerated and vented to the atmosphere.

The flow rate of the purge stream into the catalytic stages 32 and plant 34 of the plant shown in FIG. 2 tends to be even less than that into the same stages of the plant shown in FIG. 1. Typically the former flow is from 5 to 15% of that into the catalytic stages of a comparable air-based Claus plant. Accordingly, the size of the stages 32 and the plant 34, if required, and the amount of catalyst used therein, may be even smaller than in the plant shown in FIG. 1.

The relative proportions of the recycle and purge streams are selected in a similar manner to that described hereinabove with reference to FIG. 1. Increasing the recycle flow increases the ratio of non-combustibles (argon, nitrogen and oxides of carbon) to hydrogen sulphide in both the purge and recycle flows and decreases the overall size of the purge flow required. In practice, the size of the recycle may be chosen so as, for example, to give a desired hydrogen sulphide to non-combustibles ratio in the feed to the second reaction furnace 38, or, for example, to give a desired temperature in the first reaction furnace 4.

Figure 3:
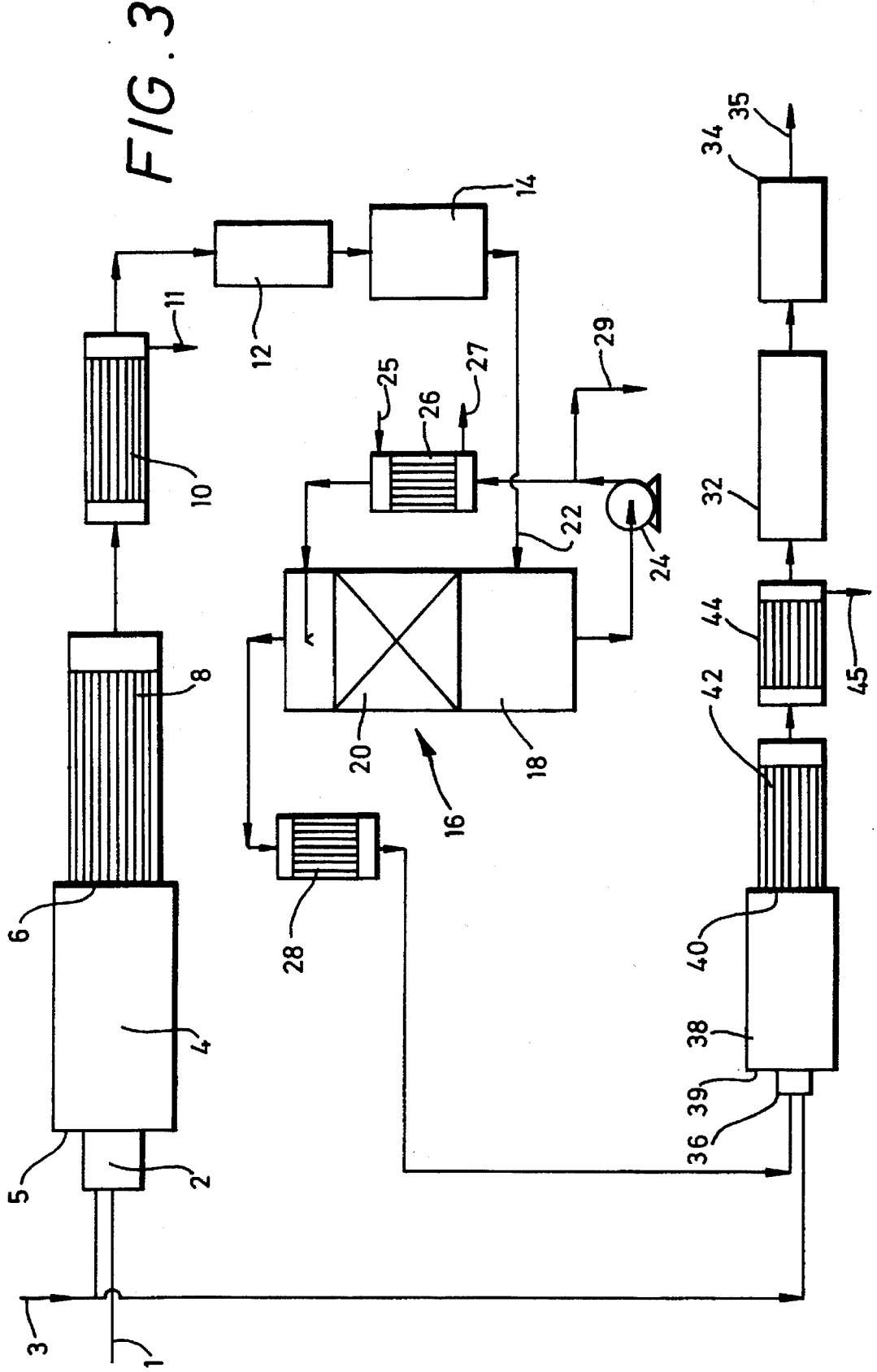
FIG. 3 is a schematic flow diagram illustrating a third plant for treating a feed gas stream comprising hydrogen sulphide.

Referring now to FIG. 3 of the accompanying drawings, the plant shown therein and its operation are similar to that shown in FIG. 2. Accordingly like parts in the two drawings are identified by the same reference numerals. Essentially the only difference between the plants shown in FIGS. 2 and that shown in 3, is that in the former there is recycle of same of the gas stream leaving the heater 28, while in the latter all the gas stream leaving the heater 28 passes to the burner 36. Accordingly, the fan 30 and the associated recycle line are omitted from the plant shown in FIG. 3. In all other respects, the operation of the plant shown in FIG. 3 is analogous in that shown in FIG. 2, so no further description is necessary herein.

In one possible, though not preferred, modification to the plant shown in in FIG. 2 or FIG. 3 a part of the gas stream leaving the sulphur condenser 10 may by-pass the heater 12, the second reactor 14, the water condenser 16, and the reheater 18, and may flow directly to the burner 36.

Figure 4:
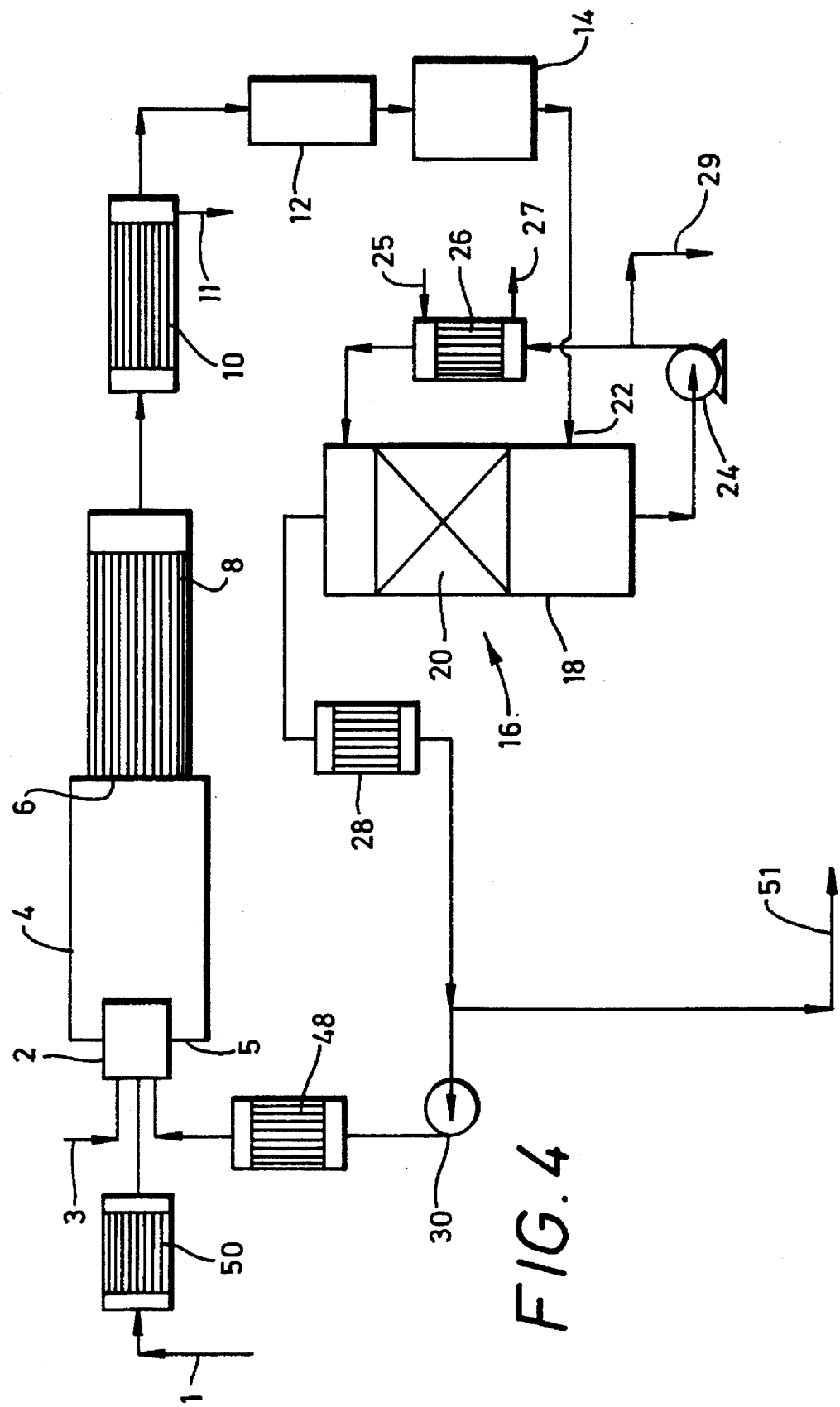
FIG. 4 is a schematic flow diagram illustrating a fourth plant for treating a feed gas stream comprising hydrogen sulphide.

The plant shown in FIG. 4 which is suitable for treatment of a feed comprising amine gas is similar to that shown in FIG. 2 and like parts in the two drawings are identified by the same reference numerals. One major difference between the two plants is that in the one shown in FIG. 4 the purge stream may be passed directly to an incinerator (not shown). Accordingly, none of the burner 36, the furnace 38, the sulphur condenser 44, the catalytic stages 32, the tail gas clean-up unit 34 and the outlet 35 of FIG. 2 is employed in the plant shown in FIG. 4. In order to enable the omissions to be made while at the same time producing a purge gas stream 51 suitable for incineration a high recycle to feed ratio and a high recycle to purge ratio are employed and both the recycle stream and the feed gas stream are preheated to a temperature in the range of 100° to 300° C. The former preheating is accomplished in a heat exchanger 48 preferably by heat exchange with superheated steam; the latter preheating is achieved in a heat exchanger 50, communicating with the pipeline 1, upstream of the burner 2, preferably by heat exchange with superheated steam. In other respects, the operation of the plant shown in FIG. 4 is similar to that shown in FIG. 2.

In one illustrative example of operation of the plant shown in FIG. 4 to treat feed consisting of an amine gas having a composition as follows:

90% by volume $H_2S$; 6% by volume $H_2O$; 3% by volume $CO_2$; and 1% by volume hydrocarbons is employed. To achieve an effective conversion of about 98% in the furnace 4, the volumetric rate of recycle is approximately 175% of the volumetric rate of feeding the feed gas to the burner 2. The purge stream contains approximately 5 moles of $CO_2$ and approximately 1.5 moles of $H_2S$ for each 100 moles of feed gas, thereby giving a hydrogen sulphide conversion of about 98%. 25% of the total $H_2S$ entering the burner 2 is burnt to form sulphur dioxide and water vapor.

The recycle to feed ratio tends rapidly to increase with increasing percentage conversions above 98%, thereby increasing the need for preheat of the recycle and adding a requirement for increasing size of the furnace 4.

The plant shown in FIG. 4 may be modified by including a stage of separation of hydrogen sulphide intermediate the heater 28 and the point at which the purge stream is taken form the gas stream from which water has been extracted. This separation may be effected by washing the gas stream with a suitable amine. Alternative modification the hydrogen sulphide may be separated from the purge stream rather than from a region upstream of where the gas mixture being treated is divided into purge and recycle streams.

Figure 5:
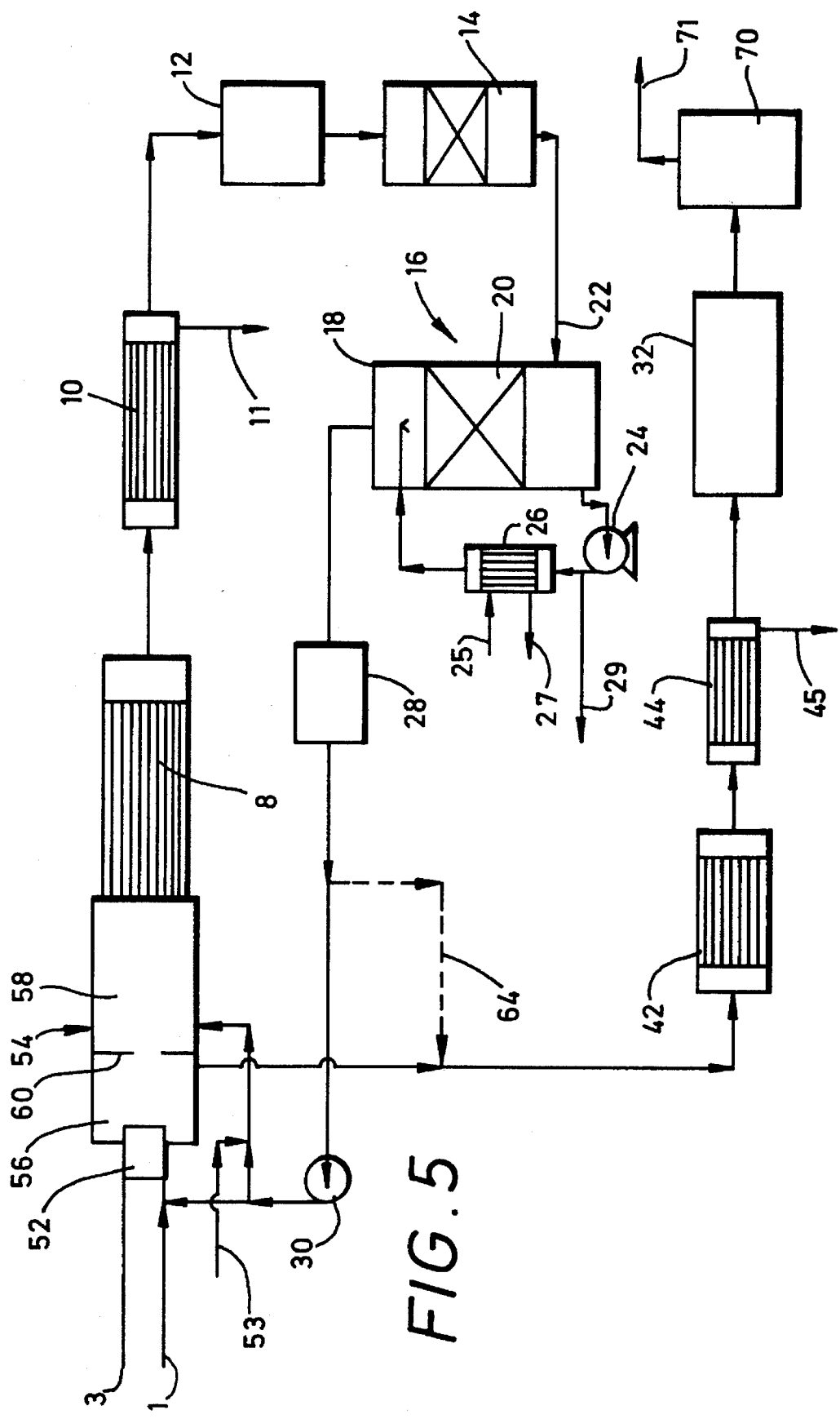
FIG. 5 is a schematic flow diagram illustrating a fifth plant for treating a gas stream comprising hydrogen sulphide.

The plant shown in FIG. 5 of the drawings has a number of similarities to that shown in FIG. 2. In the plant shown in FIG. 2 there are two furnaces 4 and 38 in which combustion of hydrogen sulphide takes place each with a single flame zone. In the plant shown in FIG. 5 there is no direct equivalent to the downstream furnace 38 shown in FIG. 2. Referring to FIG. 5, a first hydrogen sulphide containing feed gas stream typically comprising at least 60% by volume of combustibles typically and also including carbon dioxide is fed from the pipeline 1 to a burner 52 which fires into an upstream region 56 of a first reactor in the form of a refractory lined furnace 54. The first feed gas stream is mixed upstream of its entry into the burner 52 with a first recycle stream comprising carbon dioxide and hydrogen sulphide, the formation of which recycle stream is described below. The burner 52 is supplied with a stream of either substantially pure oxygen or oxygen-enriched air. The ratio of the rate of supply of hydrogen sulphide to the rate of supply of oxygen molecules available for reaction with it is arranged to be 'stoichiometric'. Accordingly, in an upstream flame zone (not shown) produced by the burner about one third of the incoming hydrogen sulphide is burnt to yield sulphur dioxide and water vapor. Some of the resulting sulphur dioxide reacts with residual hydrogen sulphide to form sulphur vapor and water vapor. A number of other chemical reactions take place in the upstream flame zone generally as herein described with reference to FIG. 1. A part of the resulting gases flow through a baffle 60 into a downstream region 58 of the furnace 54. A second feed stream comprising hydrogen sulphide is fed directly from a pipeline 53 to the downstream region 58 of the furnace 54 and therefore by-passes the upstream region 56 and the flame zone therein. The second feed stream is mixed with a second recycle gas comprising hydrogen sulphide and carbon dioxide, the formation of which recycle gas stream is described below.

Typically in an oil refinery, there are two main sources of hydrogen sulphide: amine gas and sour water stripper gas. The latter contains a substantial proportion of ammonia. No sour water stripper gas is included in the second feed stream, If it is required to treat sour water stripper gas in accordance with the invention, the sour water stripper gas is used to form the first feed stream typically in a mixture with amine gas, while the second feed stream consists essentially of amine gas. The temperature in the first flame zone is maintained sufficiently high typically at least 1200° C. so as to ensure that all the ammonia is burned since ammonia has a detrimental effect on catalysts used in downstream stages of the method.

A purge stream is withdrawn from the upstream region 56 of the furnace 54. This purge stream then passes through a series of stages comprising a waste heat boiler 42, a sulphur condenser 44, and a train 32 of catalytic stages, all of which are respectively analogous to the corresponding stages of the plant shown in FIG. 2 and described hereinabove with reference to FIG. 2. The gas mixture leaving the train 32 then passes into a incinerator 70 in which any residual hydrogen sulphide is burnt. The gas from the incinerator 70 is vented to atmosphere via an outlet 71.

Gas flowing out of the downstream flame zone of the furnace 54 passes out of the downstream region 58 thereof into a waste heat boiler 8. From the waste heat boiler 8, the gas passes through a train of stages consisting in sequence of a sulphur condenser 10, a heater 12, a second reactor 14, a water condenser 16, and a heater 28, the flow being assisted by operation of a fan 30. These stages and their operation are analogous to the corresponding stages of the plant shown in FIG. 2. Typically, none of the gas stream from intermediate the heater 28 and the fan 30 is introduced into the purge stream withdrawn from the upstream region 56 of the furnace 54. Instead, the gas from the fan 30 is recycled to the furnace 54, being divided to form the aforementioned first and second recycle streams respectively as previously described. Even though the gas recycled to the furnace 54 may contain a relatively large proportion of non-combustibles, by directing an appropriate proportion of it to the downstream region 58 in preference to the burner 52, it becomes possible to maintain an acceptable flame temperature in the upstream region 56 of the furnace 54.

It is also possible if desired to operate the burner 52 with less than a 'stoichiometric' ratio of hydrogen sulphide to oxygen molecules available for reaction therewith such that the mole ratio of hydrogen sulphide to sulphur dioxide in the purge gas stream is less than 2 to 1. Such a method of operation tends to enhance the resulting flame temperature in the upstream region 56 of the furnace 54. In order to ensure that there is a suitable mole ratio of hydrogen sulphide to sulphur dioxide namely, about 2 to 1, in the gas mixture entering the train 32 of catalytic stages, an appropriate proportion of the hydrogen sulphide gas stream leaving the heater 28 is introduced into the purge gas stream upstream of the waste heat boiler 42 via a by-pass conduit 64.

Typically, the purge stream may be from about 10 to about 20% of the flow through a conventional air-based Claus plant of the same overall capacity. In addition, it is possible we believe to convert more than 98% by weight of the incoming sulphur content of the feed gas streams to recoverable sulphur upstream of the incinerator 70.

I claim:

1. A method of treating a feed gas stream comprising hydrogen sulphide, comprising the steps of:

a) in a first reactor converting to sulphur dioxide a part of the hydrogen sulphide content of the feed gas stream by combustion thereof and reacting thus formed sulphur dioxide with residual hydrogen sulphide to form sulphur vapor and water vapor, so as to produce a sulphur-containing gas stream comprising hydrogen sulphide, sulphur dioxide, water vapor and sulphur vapor;

b) extracting sulphur vapor from the sulphur-containing gas stream;

c) in a second reactor reducing to hydrogen sulphide at least part of the sulphur content of the gas stream from which sulphur vapor has been extracted, there being no catalysed reaction between the hydrogen sulfide and sulphur dioxide between steps a) and c);

d) extracting water vapor from the reduced gas stream so as to form a secondary gas stream comprising hydrogen sulphide;

e) returning at least part of the secondary gas stream to the first reactor and taking as a purge stream at least one of a part of the gas stream intermediate steps (b) and (c) and another part of the secondary gas stream; and f) discharging the purge stream.

2. A method of treating a feed gas stream comprising hydrogen sulphide, comprising the steps of:

a) in a first reactor converting to sulphur dioxide a part of the hydrogen sulphide content of the feed gas stream by combustion thereof and reacting thus formed sulphur dioxide with residual hydrogen sulphide to form sulphur vapor and water vapor, so as to produce a sulphur-containing gas stream comprising hydrogen sulphide, sulphur dioxide, water vapor and sulphur vapor;

b) extracting sulphur vapor from the sulphur-containing gas stream;

c) in a second reactor reducing to hydrogen sulphide at least part of the sulphur content of the gas stream from which sulphur vapor has been extracted, there being no catalysed reaction between the hydrogen sulphide and sulphur dioxide between steps a) and c);

d) extracting water vapor from the reduced gas stream so as to form a secondary gas stream comprising hydrogen sulphide;

e) returning at least a part of the secondary gas stream to the first reactor and taking as a purge stream a gas stream from the first reactor comprising hydrogen sulphide, sulphur dioxide, sulphur vapor and water vapor;

f) discharging the purge stream.

3. A method of treating a feed gas stream comprising hydrogen sulphide, comprising the steps of:

a) in a first reactor converting to sulphur dioxide a part of the hydrogen sulphide content of the feed gas stream by combustion thereof and reacting thus formed sulphur dioxide with residual hydrogen sulphide to form sulphur vapor and water vapor, so as to produce a sulphur-containing gas stream comprising hydrogen sulphide, sulphur dioxide, water vapor and sulphur vapor;

b) extracting sulphur vapor from the sulphur-containing gas stream;

c) in a second reactor reducing to hydrogen sulphide at least part of the sulphur content of the gas stream from which sulphur vapor has been extracted, there being no catalysed reaction between the hydrogen sulphide and sulphur dioxide between steps a) and c);

d) extracting water vapor from the reduced gas stream so as to form a secondary gas stream comprising hydrogen sulphide;

e) taking at least part of the secondary gas stream as a purge stream without returning any of it to the first reactor; and f) passing said purge stream to at least one further reactor and converting pan of its hydrogen sulphide content of said purge stream to sulphur dioxide by combustion of the hydrogen sulphide and reacting the so-formed sulphur dioxide with hydrogen sulphide to form further sulphur vapor; and g) extracting said further sulfur vapor from said purge stream to form a residual gas stream.

4. The method as claimed in claim 1, in which the said part of the hydrogen sulphide content of the feed gas stream is converted to sulphur dioxide by combustion supported by oxygen or oxygen-enriched air and mole ratio of hydrogen sulphide to available oxygen entering the first reactor is in the ratio of 1.8 to 2.2:1.

5. The method as claimed in claim 4, in which the purge gas stream is taken from intermediate said steps (b) and (c) and is subjected to at least one stage of catalysed reaction between hydrogen sulphide and sulphur dioxide so as to form further sulphur vapor.

6. The method as claimed in claim 1, in which said part of the hydrogen sulphide content of the feed gas stream is converted to sulphur dioxide by combustion supported by oxygen or oxygen-enriched air the mole ratio of hydrogen sulphide to available oxygen entering the first reactor is greater than 2.2:1 and the purge stream comprises said another part of the secondary gas stream.

7. The method as claimed in claim 5, in which at least part of the secondary gas stream is passed to at least one further reactor wherein a part of its hydrogen sulphide content is converted to sulphur dioxide and so-formed sulphur dioxide reacts with hydrogen sulphide to form further sulphur vapor; oxygen or oxygen-enriched air is used to support combustion of the said part of the hydrogen sulphide content of the secondary gas stream so as to convert it to sulphur dioxide; said further sulphur vapor is extracted and a residual gas stream comprising hydrogen sulphide and sulphur dioxide is subjected to at least one stage of catalysed reaction between hydrogen sulphide and sulphur vapor to form yet further sulphur vapor.

8. The method as claimed in claim 6, in which no further reaction between hydrogen sulphide in the purge stream and sulphur dioxide takes place.

9. The method as claimed in claim 8, in which one or both of the feed gas stream and the part of the secondary gas stream returned to the first reactor are preheated to a temperature in the range of 100° to 500° C.

10. The method as claimed in claim 2, wherein the purge gas stream is taken from an intermediate region of the first reactor and has a mole ratio of hydrogen sulphide to sulphur dioxide less than the mole ratio thereof at the downstream end of the first reactor.

11. The method as claimed in claim 2, in which at least some of the secondary gas stream returning to the first reactor by-passes a flame zone in which combustion of the hydrogen sulphide takes place.

12. The method as claimed in claim 11, in which the purge gas stream is taken from a region of the first reactor downstream of the flame zone and upstream of the region of the first reactor where secondary gas mixes with gas that has passed out of the flame zone.

13. The method as claimed in claim 11, in which some of the feed gas stream by-passes the flame zone.

14. The method as claimed in claim 2, in which some of the secondary gas stream is introduced into the purge gas stream.

15. The method as claimed in claim 2, in which in step (c) the reduction of the sulphur dioxide is performed by hydrogen in a catalysed reaction, at least some of the hydrogen being formed in situ.

16. The method as claimed in claim 2, in which the water is extracted step (d) by being condensed out of the reduced gas stream.

17. An apparatus or plant for treating a feed gas stream, comprising:
   a) a first reactor for convening to sulphur dioxide a part of the hydrogen sulphide content of the feed gas stream by combustion thereof and for reacting thus formed sulphur dioxide with residual hydrogen sulphide to form sulphur vapor and water vapor, so as to produce to sulphur-containing gas stream comprising hydrogen sulphide, sulphide dioxide, water vapor and sulphur vapor;
   b) means for extracting sulphur vapor from the sulphur-containing gas stream;
   c) a second reactor, downstream of the sulphur vapor extraction means, for reducing to hydrogen sulphide the sulphur dioxide content of at least pan of the gas stream;
   d) the sulphur vapor extracting means and the second reactor located downstream of said first reactor such that there is no catalysed reaction between the hydrogen sulphide and sulphur dioxide between said first reactor and said second reactor;
   e) means for extracting water vapor from the reduced gas stream so as to form a secondary gas stream comprising hydrogen sulphide;
   f) means for returning at least pan of the secondary gas stream to the first reactor and means for taking as a purge stream at least one of a pan of the gas stream intermediate the sulphur extraction means and the second reactor and another part of the secondary gas stream; and
   g) means for discharging the purge stream.

18. An apparatus or plant for treating a feed gas stream, comprising:
   a) a first reactor for convening to sulphur dioxide a pan of the hydrogen sulphide content of the feed gas stream and for reacting thus formed sulphur dioxide with residual hydrogen sulphide to form sulphur vapor and water vapor, so as to produce to sulphur-containing gas stream comprising hydrogen sulphide, sulphide dioxide, water vapor and sulphur vapor;
   b) means for extracting sulphur vapor from the sulphur-containing gas stream;
   c) a second reactor, downstream of the sulphur vapor extraction means, for reducing to hydrogen sulphide the sulphur dioxide content of at least part of the gas stream;
   d) the sulphur vapor extracting means and the second reactor located downstream of said first reactor such that there is no catalysed reaction between the hydrogen sulphide and sulphur dioxide between said first reactor and said second reactor;
   e) means for extracting water vapor from the reduced gas stream so as to form a secondary gas stream comprising hydrogen sulphide;
   f) means for returning at least part of the secondary gas stream to the first reactor and means for taking as a purge stream at least one of a part of the gas stream intermediate the sulphur extraction means and the second reactor and another part of the secondary gas stream;

g) at least one further reactor for converting part of the hydrogen sulphide content of said purge stream to sulphur dioxide by combustion of the hydrogen sulphide and reacting the so-formed sulphur dioxide with the hydrogen sulphide to form further sulphur vapor; and g) means for extracting said further sulfur vapor from said purge stream to form a residual gas stream.

* * * * *